May 2, 1961     H. W. CHAPMAN     2,982,230
CROSS BAR
Filed March 9, 1956     2 Sheets-Sheet 1
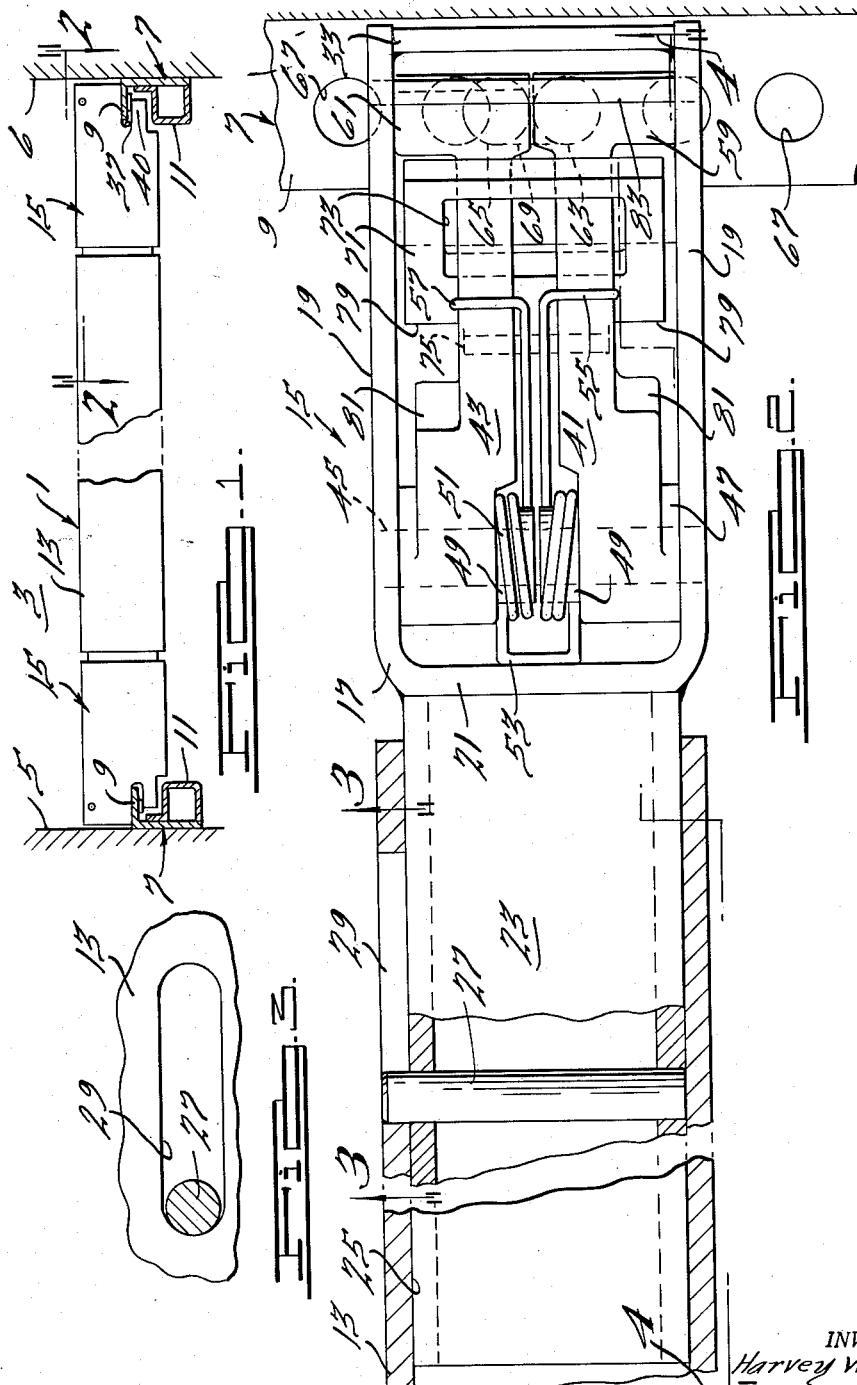
INVENTOR.
Harvey W. Chapman
BY
Harness, Dickey & Pierce
ATTORNEYS.

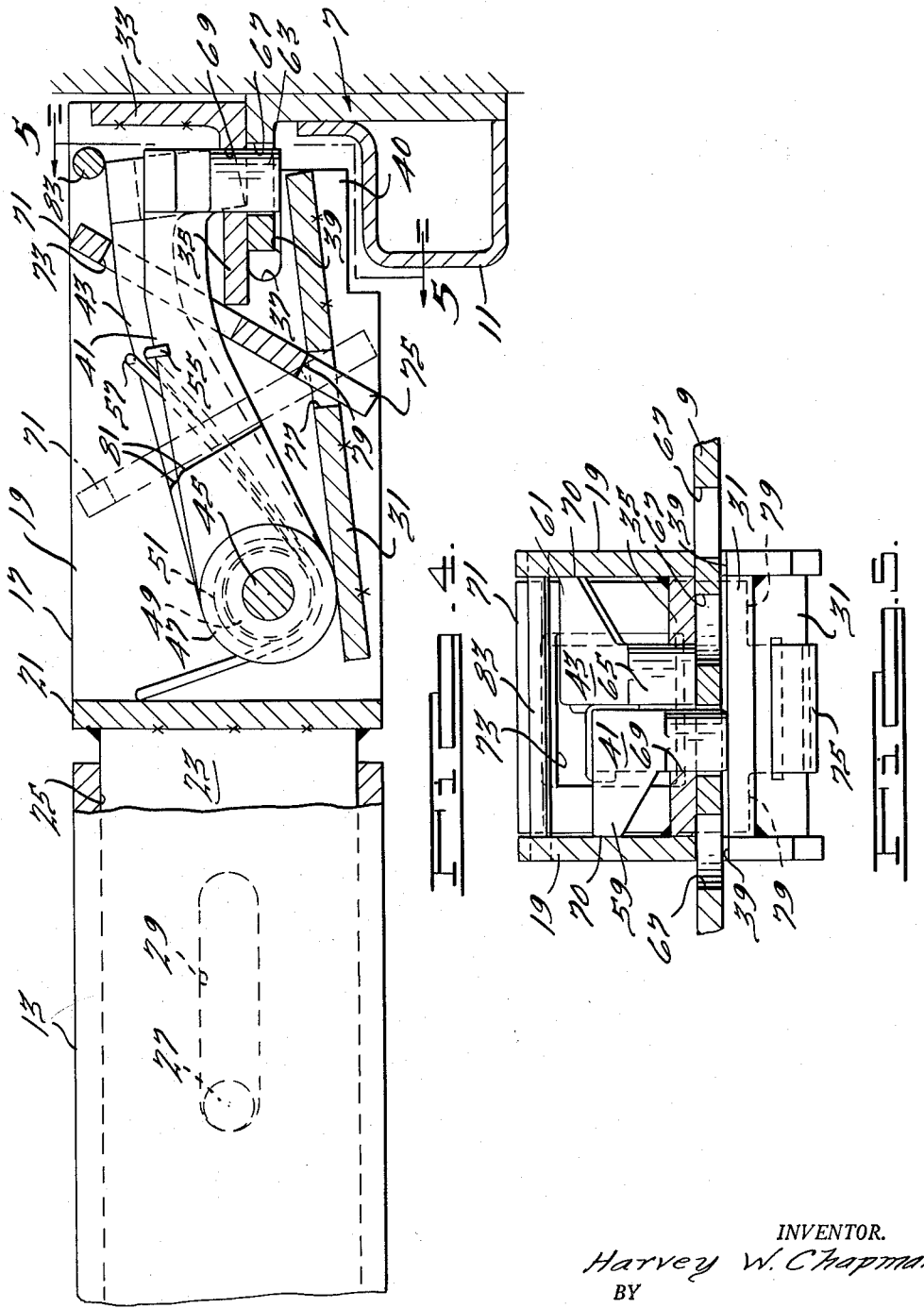

`United States Patent Office`

2,982,230
Patented May 2, 1961

2,982,230

CROSS BAR

Harvey W. Chapman, Detroit, Mich., assignor to Evans Products Company, Plymouth, Mich., a corporation of Delaware Filed Mar. 9, 1956, Ser. No. 570,478

7 Claims. (Cl. 105—369)

This invention relates to freight or cargo bracing bars such as are commonly used in freight storage compartments to hold cargo in place. The invention constitutes an improvement in the freight bracing bar disclosed and claimed by my co-worker Henry L. Dunlap in United States Patent No. 2,879,722, the application for which was filed of even date herewith and assigned to the assignee hereof.

It is the purpose of this invention to provide a freight bracing bar which can be mounted in a plurality of positions on any given set of supporting elements so that pitch splitting is obtained.

In the form of the invention described herein, pitch splitting is obtained by means of a plurality of latch members mounted on the ends of the bar, all of which can cooperate with support elements but less than all of which are operative at a time. Since the support elements have a fixed position, the use of different latch members positions the freight engaging sides of the bar at different locations with respect to the support elements, thus providing pitch splitting.

The invention is illustrated in the accompanying drawings in which:

Figure 1 is a schematic cross section through a freight car or other freight storage compartment and shows a freight bracing bar embodying the invention secured in operative position to supporting members;

Fig. 2 is an enlarged plan view of the cross bar of Fig. 1, partly in section, as seen from line 2—2 of Fig. 1;

Fig. 3 is a section along the line 3—3 of Fig. 2;

Fig. 4 is a section along the line 4—4 of Fig. 2; and

Fig. 5 is a section along the line 5—5 of Fig. 4.

Referring first to Fig. 1, a cross bar 1 constructed in accordance with the principles of the invention, is shown in operative position in a freight storage chamber 3 which is defined by opposite surfaces 5 and 6, these surfaces ordinarily, but not necessarily, being vertical walls such as the side walls of a freight car. Rigidly secured to the surfaces 5 and 6 by any suitable means are the cross bar support members 7 which are illustrated as being angular in shape with the vertical flanges attached to the surfaces 5 and 6 and the horizontal flanges 9 engaged by the ends of the cross bar 1. The angle members 7 have buffer sections 11 attached to their vertical flanges to prevent freight from engaging and being damaged by the relatively thin edges of the horizontal flanges 9.

The cross bar 1 comprises a relatively long central body section 13 of any suitable shape and material (though preferably square or rectangular and constructed of reinforced wood or plastic) and relatively short end headers 15, preferably of identical construction, telescopically connected to opposite ends of the body section 13. As shown, the headers 15 are preferably shaped so that they are substantially continuations of the surface defined by the body 13, thus providing the cross bar 1 with a freight engaging area that extends the full length of the bar and which contains no projections that might be engaged by freight or which might be damaged if the cross bar is thrown about by workmen.

It will be observed that in the case of a freight car or other moving vehicle where there are forces of considerable magnitude acting in all directions, the end headers 15 must be connected to the support members 7 in such a way that they resist, without disconnection, forces that are directed lengthwise of the bar 1, lengthwise of the members 7, and substantially perpendicular or transverse to the flanges 9. As seen best in Figs. 2–5, the headers 15 accomplish this by means of a construction in which a yoke or U-shaped member 17 serves as a housing for the various operating parts, the legs 19 of the housing being aligned with and a continuation of the body section 13. Welded to the base 21 of the housing 17 is a neck or tubular extension 23 that slidably fits in an opening 25 in the end of the body 13 to provide for relative axial motion or telescoping between the header 15 and the body 13. Disconnection of the header from the body is prevented by radial pin 27 affixed to neck 23 which works in a slot 29 cut in the wall of body opening 25. The slot and pin are arranged so as to dispose the legs 19 in substantially vertical planes, when the bar is used horizontally as in Fig. 1, thus leaving the header 15 with an open top, the bottom of the header being substantially closed by a transverse, slightly inclined reinforcement plate 31 welded to the insides of opposite legs 19.

The legs 19 are reinforced at their outer ends and provided with a downwardly presenting support surface to rest on the horizontal flange 9 by a transverse angle piece 33 that is welded to the legs 19. The angle 33 is disposed so that its vertical flange is at the ends of the legs and the horizontal flange 35 is disposed beneath the vertical flange and extends inwardly from the ends of the legs 19, it being spaced below the vertical midplane of the bar 1 by about the thickness of flange 9. It will be seen that the yoke 17, angle 33, and plate 31 form a sort of open top box which is high in strength but of minimum weight.

As seen in Fig. 4, the weight of the bar 1 and down loads on it will be transmitted by the bottom of flange 35 to the support member 7 on which it rests. In order to resist disconnection by up loads on the bar, the free ends of the legs 19, below angle 33, are cut out to clear buffer 11 and to provide a slot or mouth 37 that will fit over the flange 9 so that upwardly presenting surfaces 39 on lips 40 of the legs will engage the bottom of the flange 9 in the event of an up load. The cross plate 31 or other cross piece can, if desired, be readily disposed in coplanar alignment with surfaces 39 to provide an up load resisting surface extending all the way across the width of the header 19. It will be noted that plate 31 reinforces the lips 40 against distortion in case the bar is thrown out of a freight car on its end.

As thus far described, it will be seen that upon telescopic motion of the header 15 with respect to the body section, the mouth 37 can be moved either over or away from the support flange 9. Latch means is provided in the header 15 to prevent undesired telescopic motion away from the flange 9 which might cause disconnection. In addition to resisting telescopic motion, i.e., take loads running lengthwise of the bar 1, this latch means is designed to take loads that run lengthwise of the support members 7. The latch means comprises left and right hand latch members 41 and 43 which extend lengthwise of the bar between the legs 19 and are pivoted at their inner ends on a cross pin 45 that is supported at opposite ends by legs 19 and which is located on a level with mouth 37 (i.e., flange 9). The latches 41 and 43 have enlarged bosses 47 on their outer sides which bear against legs 19 and somewhat smaller bosses 49 on their inner sides which are close enough together to engage each other when side loads are put on a latch member. The bosses contain the necessary apertures for the pin 45 and the inside bosses 49 further serve as a support for a torsion coil spring 51, the central portion 53 of which reacts against base 21 while the free ends 55 and 57 bear downwardly with spring force upon the tops of latches 41 and 43, respectively, at a point remote from pin 45 and on the opposite side thereof from spring section 53. The latches 41 and 43 are spaced apart outwardly of bosses 49 to accommodate sections of the spring 51 but their outermost ends 59 and 61 are enlarged so as to be wide enough to engage each other and also the legs 19. Depending downwardly from the inside sections of the ends 59 and 61 are round pins or projections 63 and 65 which are adapted to fit in similarly shaped holes 67 formed in the flange 9. The horizontal flange 35 of angle 33 has a slot 69 therein through which both pins 63 and 65 extend, the outside surfaces of the pins being capable of bearing against the ends of the slot 69 when side loads (i.e. loads running lengthwise of flange 9) are put on either latch member. Since the pivot pin 45 is on a level with the angle flange 9, the pins 63 and 65 can be dropped through holes of substantially the same diameter, thus enabling slot 69 to be made of substantially the same width as the pin diameter so that it can give maximum support to the pins. This feature also minimizes any tendency of axial loads on the bar to cause rotation of the latch lever. It will be appreciated that the depth of slot 37 can be made somewhat less than illustrated so that when the bottom thereof abuts the edge of flange 9 the pins will be in vertical alignment with the row of holes 67. The centers of pins 63 and 65 are spaced apart by a distance equal to one half the spacing of holes 67 so that only one pin at a time can fit in a hole 67 and so that one half pitch splitting with respect to the pitch of holes 67 is provided. With one half pitch splitting, the sides of the body 13 can be indexed along the length of the car in increments equal to one half the spacing between holes 67. If desired, the midpoint between the centers of pins 63 and 65 can also be offset from the center line of the bar 1 so that further pitch splitting can be obtained by reversing the bar end for end or by turning it over in which case suitable provision should be made to clear or eliminate buffer 11. Vertical pitch splitting by turning the bar over can be obtained by offsetting the bottom of flange 35 the proper distance from the midplane of the bar. It may be noted that if a non-pivotal connection with the angle 7 is desired. the pins and holes 67 may be non-circular or the latch means may be arranged so that two pins are simultaneously engaged in two holes in angle 7. This latter could be done, for example, by simply combining the two latches 41 and 43 into one single latch having two pins to engage in two holes 67, the midpoint between the pins being offset from the axis of the bar 1, if desired, to give pitch splitting by reversing the bar end for end or turning it upside down.

It will be seen that loads lengthwise of the bar 1, as caused, for example, by breathing of side walls defining surfaces 5 and 6, will be taken in shear by a pin 63 or 65 and transmitted to either the inner or outer side edge of slot 69 and thence through the angle 33 into the side legs 19, relatively little, if any, force being thrown on the cross pin 45. If it is desired to put the pins in double shear, instead of single shear as shown, the plate 31 could be extended slightly and provided with a slot aligned with slot 69 and the pins slightly lengthened so that they would act also on the side edges of such slot in plate 31 as well as on the edges of slot 69. In the case of loads running lengthwise of angles 7 and transverse to the bar 1, as caused, for example, by a shifting of cargo in space 3 when the vehicle is accelerated or decelerated, the latch members bear at two areas on the legs 19, i.e., bosses 47 and outside edges 70 of ends 59 and 61, as well as against each other so that there will be no substantial bending loads on the pivot pin 45. Further, the pins 63 and 65 bear against each other and against the ends of slot 69 with the result that such transverse loads on the bar 1 are transmitted from legs 19 into one of the pins 63 or 65 and thence into angle 7 without any possibility for them to bend the latch members or the pin 45.

In order to move the latches 41 and 43 upwardly to withdraw them from holes 67 and permit movement of the bar 1 relative to angles 7, there is provided a latch operator 71 in the form of a plate having an opening 73 through which pass the latch members. The bottom of the plate 71 is reduced in width to form a tongue 75 that fits in a slot 77 in plate 31 so that the plate 71 can be rocked over center on transverse shoulders 79. The plate 71 is in its inoperative position in the right hand (full line) position of Fig. 4. The top of plate 71 is accessible at the open top of header 15 and when it is moved to the left hand (dotted line) position of Fig. 4, the bottom of opening 73 will engage the bottoms of the latch levers 41 and 43 to lift the bottoms of pins 63 and 65 above the bottom of flange 69. In this position, spring force on the latches will tend to hold the plate 71 seated against the shoulders 81 on the latches 41 and 43. Excessive upward movement of the latch levers against the force of spring 51 is prevented by a cross pin 83 which acts as an up stop for the ends of the latches.

In operation, the latch operator 71 is moved to operative or retract position as seen in phantom in Fig. 4 whereupon the head 15 can be telescopically extended so that mouth 37 fits over flange 9. Latch plate 71 is then moved to the release or right hand position in Fig. 2 to allow the pins 63 and 65 to drop under spring pressure and by gravity if the bar is upright as illustrated, so that one of the pins will be ready to enter a hole 67 as soon as the bar is shifted into alignment therewith.

In addition to the various features that have already been pointed out, it should be noted that the header construction can be readily assembled and disassembled, as required, for servicing. It is only necessary to remove pin 45 and all the movable parts can be easily withdrawn for repair or replacement.

I claim:

1. In a cross bar for attachment to a support member having a supporting surface and a series of spaced openings therethrough. an end header for the cross bar including means defining a chamber and a load supporting surface adapted to rest on said supporting surface of said support member, a pair of latch members having pins thereon adapted to extend in said openings. means mounting said latch members on said end header and in said chamber for movement independently of each other to selectively extend said pins into said openings, said pins being located on centers that are spaced apart transversely of said bar by a distance different than the spacing of said openings along said supporting surface of said support member.

2. The invention set forth in claim 1 wherein said openings are uniformly spaced and wherein the spacing of said centers is substantially half the spacing between the centers of said openings.

3. The invention set forth in claim 1 wherein the midpoint between said pins is offset from the longitudinal axis of the bar.

4. In a cargo bracing bar for attachment to a support member having a series of attachment means spaced therealong, said cross bar having attaching means at one end, said attaching means including two levers pivoted on said attaching means for independent pivotal movement about an axis transverse to the length of the bar and located inwardly of the end of the bar, said levers having means on the ends thereof for connection to said attachment means, the spacing of said last mentioned means transversely of said attaching means being different from the spacing of said attachment means along said support member whereby only one of said levers is operative at a time.

5. In a freight bracing bar for attachment to a support member having a series of attachment means spaced therealong, an attachment device at an end of said bar including a pair of movable latch members having means thereon for connection to said attachment means, means mounting said latch members on said device for movement relative to said bar independently of each other and in a direction transverse to the length of said bar, said latch member means being spaced apart transversely of said bar by a distance different than the spacing of said attachment means along said support member whereby only one of said latch member means is operative at a time.

6. The invention set forth in claim 5 wherein said attachment means are uniformly spaced and wherein said latch member means are spaced apart by a distance substantially half the spacing of said attachment means.

7. The invention set forth in claim 5 wherein the midpoint between said latch member means is offset from the longitudinal axis of the bar.

References Cited in the file of this patent

UNITED STATES PATENTS

| | | |
|---|---|---|
| 2,091,869 | McCurdy | Aug. 31, 1937 |
| 2,294,795 | Moses | Sept. 1, 1942 |
| 2,725,826 | Tobin et al. | Dec. 6, 1955 |
| 2,873,695 | Tobin | Feb. 17, 1959 |